US008688851B2

(12) United States Patent
Shin et al.

(10) Patent No.: US 8,688,851 B2
(45) Date of Patent: Apr. 1, 2014

(54) SYSTEM AND METHOD FOR CONTROLLING SYNCHRONIZATION OF MEDIA AND MULTI-DEVICES FOR SINGLE-MEDIA MULTI-DEVICE MEDIA SERVICE

(75) Inventors: Hyun-Soon Shin, Daejeon (KR); Jae-Kwan Yun, Daejeon (KR); Hae-Ryong Lee, Daejeon (KR); Kwang-Roh Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1153 days.

(21) Appl. No.: 12/155,458

(22) Filed: Jun. 4, 2008

(65) Prior Publication Data

US 2009/0089812 A1 Apr. 2, 2009

(30) Foreign Application Priority Data

Oct. 1, 2007 (KR) ........................ 10-2007-0098637

(51) Int. Cl.
*G06F 15/16* (2006.01)

(52) U.S. Cl.
USPC .......................................... 709/231; 725/110

(58) Field of Classification Search
USPC ................... 709/231, 232, 203, 217; 725/110
See application file for complete search history.

(56) References Cited

U.S. PATENT DOCUMENTS

| | | | | |
|---|---|---|---|---|
| 5,553,222 | A * | 9/1996 | Milne et al. | 715/201 |
| 6,363,434 | B1 * | 3/2002 | Eytchison | 719/313 |
| 6,792,323 | B2 * | 9/2004 | Krzyzanowski et al. | 700/90 |
| 7,140,033 | B1 * | 11/2006 | Durden et al. | 725/80 |
| 2004/0148419 | A1 * | 7/2004 | Chen et al. | 709/231 |
| 2005/0226601 | A1 * | 10/2005 | Cohen et al. | 386/75 |
| 2006/0064720 | A1 * | 3/2006 | Istvan et al. | 725/38 |
| 2006/0156375 | A1 * | 7/2006 | Konetski | 725/135 |

FOREIGN PATENT DOCUMENTS

| | | |
|---|---|---|
| KR | 10-2004-0090330 | 10/2004 |
| KR | 1020060068465 | 6/2006 |
| KR | 1020070060929 | 6/2007 |

OTHER PUBLICATIONS

Korean Office Action issued on Mar. 30, 2009 in corresponding Korean Patent Application 10-2007-0098637.

* cited by examiner

*Primary Examiner* — LaShonda Jacobs
(74) *Attorney, Agent, or Firm* — Staas & Halsey LLP

(57) ABSTRACT

Provided is a system and method for controlling synchronization of media and multi-devices for an SMMD media service. The system includes a metadata managing unit and a synchronization controlling unit. The metadata managing unit analyzes ne-media to extract metadata. The synchronization controlling unit constructs a synchronization information table to store control data extracted from the metadata, and controls one or more devices for media reproduction on the basis of the synchronization information table. Optimal connectable devices are mapped according to device attributes and synchronization information extracted from metadata of ne-media and the results are controlled according to the contents of media, thereby maximizing the effect of vivid media reproduction.

19 Claims, 6 Drawing Sheets

| | Mapping_ Device | Setup_ Time | T1_ Time | Control_ Time | Error_ proc_type | Interface | Control_command | | | | | Control_ value | Media status |
|---|---|---|---|---|---|---|---|---|---|---|---|---|---|
| | | | | | | | On/Off | Channel | Volume | Direction | ... | | |
| Type 1 (Sight) | Device 1 | CT1 | | | | | | | | | | | |
| | Device 2 | CT1 | | | | | | | | | | | |
| Type 2 (Hearing) | Device 3 | CT2 | | | | | | | | | | | |
| | Device 4 | CT2 | | | | | | | | | | | |
| Type 3 (touch) | Device 5 | CT3 | | | | | | | | | | | |
| | | | | | | | | | | | | | |
| Type 4 (smell) | Device 6 | CT4 | | | | | | | | | | | |
| | | | | | | | | | | | | | |
| ⋮ | ⋮ | ⋮ | ⋮ | ⋮ | ⋮ | ⋮ | ⋮ | ⋮ | ⋮ | ⋮ | ⋮ | ⋮ | ⋮ |
| Type n-1 (Wind) | Device 7 | | | | | | | | | | | | |
| | Device 8 | | | | | | | | | | | | |
| Type n (Light) | Device 9 | | | | | | | | | | | | |
| | Device n | | | | | | | | | | | | |

SYSTEM AND METHOD FOR CONTROLLING SYNCHRONIZATION OF MEDIA AND MULTI-DEVICES FOR SINGLE-MEDIA MULTI-DEVICE MEDIA SERVICE

CROSS-REFERENCE TO RELATED APPLICATIONS

This application claims priority under 35 U.S.C. §119 to Korean Patent Application No. P2007-98637, filed in Korea on Oct. 1, 2007, the disclosure of which is incorporated herein by reference in its entirety.

BACKGROUND OF THE INVENTION

1. Field of the Invention

The present disclosure relates to a system and method for controlling synchronization of media and multi-devices for a Single-Media Multi-Device (SMMD) media service, and more particularly, to a system and method for controlling synchronization of media and multi-devices for an SMMD media service, which can vividly reproduce media by suitably controlling synchronization of multi-devices.

2. Description of the Related Art

The term "multimedia" denotes a variety of media that includes characters, sounds, figures, and pictures that transfer actions from one side to another side, and a service using this is called a media service.

A related art media service is provided through an audio & video (A/V) device that displays media including moving pictures, audio signals, and texts with a display unit and an audio unit.

The related art media service was a service based on a Single-Media Single-Device (SMSD) scheme that reproduces a single media in a single device, wherein the related art media reproduction devices were no more than stereo audio devices and high-quality high-definition devices.

Recent information technology development has introduced the ubiquitous Information Technology (IT) age, thus increasing the requirement level of users. Therefore, the users intend to obtain more information from media and desire that media should be reproduced more vividly.

In order to meet these requirements, attempts are being made to apply a vivid reproduction technology capable of satisfying the five senses of the humans and an intelligent technology based inter-device cooperation to media in a united fashion. A Single-Media Multi-Device (SMMD) technology was proposed as a typical example of an intelligent media reproduction.

Most SMMD media services are yet under initial experiment and development. However, the SMMD media services are attracting much attention because their use is expected to increase.

The SMMD media services can increase the effect of vivid media reproduction by suitably interworking and controlling a variety of devices connected to a home network, thereby being expected to be widely used.

In order to provide SMMD media services suitable for an existing technology level, since what is more basically required is a scheme for controlling synchronization between media and multi-devices which have already been set individually at home, studies of which are primarily required.

SUMMARY

Therefore, an object of the present invention is to provide a system and method for controlling synchronization of media and multi-devices for an SMMD media service, and more particularly, which can synchronize multiple peripheral devices for media reproduction.

Another object of the present invention is to provide a system and method for controlling synchronization of media and multi-devices for an SMMD media service, and more particularly, which can vividly reproduce media by interworking multiple devices for media reproduction.

To achieve these and other advantages and in accordance with the purpose(s) of the present invention as embodied and broadly described herein, a system for controlling synchronization of media and multi-devices for an SMMD media service in accordance with an aspect of the present invention includes: a metadata managing unit for analyzing ne-media to extract metadata; and a synchronization controlling unit for constructing a synchronization information table to store control data extracted from the metadata, and controlling one or more devices for media reproduction on the basis of the synchronization information table.

To achieve these and other advantages and in accordance with the purpose(s) of the present invention, a method for controlling synchronization of media and multi-devices for an SMMD media service in accordance with another aspect of the present invention includes the steps of: (c) initializing a device connected to media in a home network; (d) constructing a synchronization information table; (e) parsing ne-media to extract metadata; (f) extracting data necessary for device control from the metadata to map an optimal device, and setting/managing the extracted data in the synchronization information table; and (g) performing control of synchronization of media and devices on the basis of the synchronization information table, wherein one or more devices are connected according to the contents of media.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 2 illustrates a synchronization information table according to an embodiment of the present invention;

DETAILED DESCRIPTION OF EMBODIMENTS

Hereinafter, specific embodiments will be described in detail with reference to the accompanying drawings.

Figure 1:
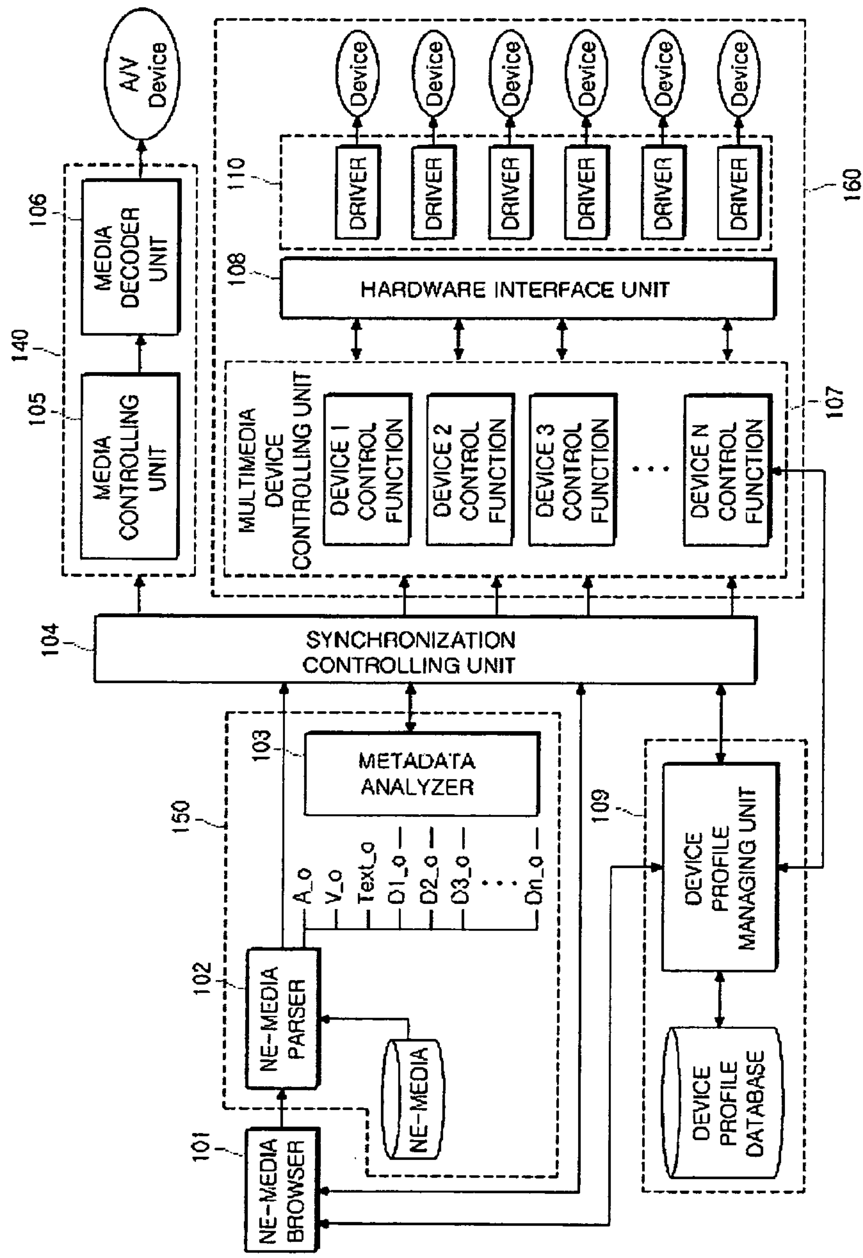
FIG. 1 is a block diagram of a system for controlling synchronization of media and multi-devices for an SMMD media service according to an embodiment of the present invention.

FIG. 1 is a block diagram of a system for controlling synchronization of media and multi-devices for an SMMD media service according to an embodiment of the present invention.

Referring to FIG. 1, the media/multi-device synchronization controlling system includes a metadata managing unit 150 and a synchronization controlling unit 104. The metadata managing unit 150 analyzes ne-media to extract metadata. The synchronization controlling unit 104 constructs a synchronization information table 200 to store control data extracted from the metadata, and controls at least any one device on the basis of the synchronization information table 200 when reproducing ne-media.

Herein, the ne-media is a new media format with a structure of providing together information for interworking with peripheral devices in order to provide an SMMD service.

That is, while accommodating convention media, the ne-media defines devices to interwork in accordance with the contents of media to provide device control information according to the sequence of media.

Herein, the term "ne' is pronounced like "any" and includes meanings such as "new", "next", and "neo".

The metadata managing unit 150 analyzes ne-media to extract metadata including device attributes and device types 201.

The metadata managing unit 150 includes an ne-media parser 102 and a metadata analyzing unit 103. The ne-media parser 102 extracts metadata (or neo-data) from ne-media, and the metadata analyzing unit 103 analyzes/extracts data, which are required for controlling devices, from the metadata.

The synchronization controlling unit 104 applies the same system time (e.g., a global clock) to all the devices in a home network for synchronization control.

Also, the synchronization controlling unit 104 constructs the synchronization information table 200 to set control information for each point/device extracted from the metadata, thereby controlling devices.

Further, the synchronization controlling unit 104 controls a device controlling means 160 and a media controlling means 140.

The device controlling means 160 includes a multi-device controlling unit 107, a hardware interface unit 108, and a device driver unit 110.

The multi-device controlling unit 107 controls at least any one device to interwork when reproducing media.

Examples of the device include not only basically video devices and audio devices but also five-sense stimulating devices such as perfuming devices, vibrating devices, wind directing devices, and light blocking devices.

The hardware interface unit 108 manages a variety of wired/wireless hardware interfaces to which devices are connected.

The device driver unit 110 converts a command of the multi-device controlling unit 107 into a format capable of being interpreted by devices connected to each interface.

The media controlling means 140 includes a medial controlling unit 105 and a media decoder unit 106 to reproduce A/V media.

The media controlling unit 105 controls the operating status of A/V media, such as Media Reproduction, Fast Reproduction, Reverse Reproduction, Fast Wind, Rewind, and Pause.

The media decoder unit 106 decodes information of A/V media into a format reproducible by an A/V reproduction device.

The media/multi-device synchronization controlling system further includes an ne-media browser 101 and a device profile managing unit 109.

The ne-media browser 101 provides an input/output (I/O) user interface of the media/multi-device synchronization controlling system.

That is, using the ne-media browser 101, a user can load a device profile, input a command for instructing synchronization control of media/multimedia devices, and monitor a process of the input command.

The device profile managing unit 109 generates the profiles of devices in the home network, and stores/manages the generated device profiles.

FIG. 2 illustrates a synchronization information table 200 according to an embodiment of the present invention.

Referring to FIG. 2, the synchronization information table 200 includes information about device types 201, mapping devices 202, operation times 203 through 205, error process types 206, interfaces 207, control commands 208, control values 209, and media statuses 210.

The device types 201 (Type 1 through Type n) are media reproduction formats provided by devices.

For example, the user may define Sight, Hearing, Touch, Smell, Wind, and Light respectively by the device types Type 1, Type 2, Type 3, Type 4, Type n−1, and Type n, among the device types 201 of the synchronization information table 200, thereby using them.

The mapping devices 202 are device types Device 1 through Device n capable of interworking with media by being actually connected in the home network.

Herein, it is preferable that the mapping devices 202 are defined for the corresponding device types 201.

For example, if the device type 201 is Type 1 (i.e., Sight), the mapping device 202 may be a device that reproduces media visually.

Specifically, if searching for devices in the home network reveals that available visual media reproduction devices are a digital television and a computer monitor, the digital television and the computer monitor may be mapped respectively to the Device 1 and the Device 2.

As another example, if the device type 201 is Type 2 (i.e., Hearing), the mapping device 202 may be a device that reproduces media acoustically.

Specifically, if searching for devices in the home network reveals that available acoustic media reproduction devices are a speaker and a headphone, the speaker and the headphone may be mapped respectively to Device 3 and Device 4.

The control command generation time (Setup_Time) 203 is the time to generate a control command 208 for controlling a device.

That is, the media/multi-device synchronization controlling system may instruct to generate a device control command 208 when the control command generation time 203 is equal to the system time.

Specifically, Device 1 and Device 2 are controlled if the control command generation time 203 is CT1. Device 3 and Device 4 are controlled if the control command generation time 203 is CT2. Device 5 is controlled if the control command generation time 203 is CT3. Device 6 is controlled if the control command generation time 203 is CT4.

However, because it takes a predetermined time to actually drive the corresponding device in response to the device control command 208 from the media/multi-device synchronization controlling system, it is preferable that the control command generation time 203 is set to be the predetermined time before the driving time 204.

It is preferable that the synchronization information table 200 is set and managed in the order of the control command generation time 203 according to sequential rows.

That is, in the embodiment of FIG. 2, it is preferable that CT1 through CT4 are sequentially set in the order of CT1>CT2>CT3>CT4.

FIG. 2 illustrates the case where the device types 201 do not overlap the mapping devices 202. However, because the same device may be driven repeatedly during media reproduction, there is a higher possibility that the device types 201 may overlap the mapping devices 202.

The driving time (T1_Time) 204 is the time for the device to start to operate.

The control time (Control_Time) 205 is a period of time taken from the generation of the device control command 208 to the start of an operation of the device.

The error process type (Error_proc_type) 206 is the type of a command to be processed when the device fails to be driven.

The interface 207 is the wired/wireless interface of the device connected to the media/multi-device synchronization controlling system.

The control commands (Control_command) 208 may be device control commands such as On/Off, Channel, Size or Volume, and Direction.

The control values (Control_value) 209 are actual device control degrees (e.g., the degree of size and the degree of volume) according to the control commands 208.

The media statuses 210 are information about media reproduction time and media operation status.

It is preferable that the synchronization information table 200 further includes the synchronization control start time (not illustrated) that is at least a synchronization control execution time before the control command generation time.

Figure 3:
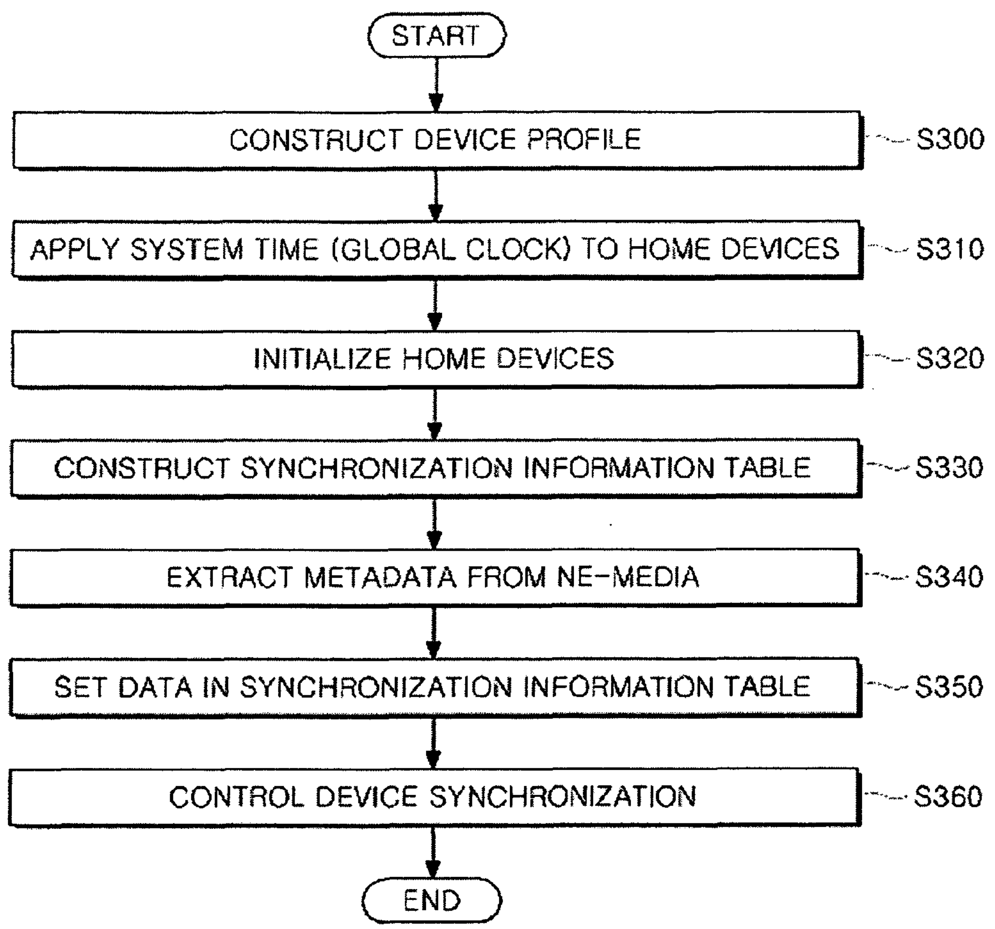
FIG. 3 is a flowchart illustrating a process of controlling synchronization of media and devices according to an embodiment of the present invention.

FIG. 3 is a flowchart illustrating a process of controlling synchronization of media and devices according to an embodiment of the present invention.

Referring to FIG. 3, in step S300, the media/multi-device synchronization controlling system obtains information about all the devices connected to media in the home network to construct device profiles.

Herein, it is preferable that the constructed device profiles are stored in the device profile database.

In step S310, the media/multi-device synchronization controlling system applies the same system time (e.g., global clock) to all the devices connected to media in the home network.

That is, the media/multi-device synchronization controlling system synchronizes devices in the home network (i.e., applies the same reference clock to the devices in the home network) in order to control a suitable device according to the contents of media.

In step S320, the media/multi-device synchronization controlling system initializes the devices in the home network.

In step S330, the media/multi-device synchronization controlling system constructs the synchronization information table 200 for storing a list of devices connectable in the home network and device control data (i.e., data necessary for device control).

Herein, it is preferable that the synchronization information table 200 is a type of database in which separate data have not yet been stored.

In step S340, the media/multi-device synchronization controlling system parses ne-media to extract metadata (or neodata).

In step 350, the media/multi-device synchronization controlling system analyzes the extracted metadata to extract device control data, and sets the same in the synchronization information table 200.

Herein, the synchronization information table 200 includes information about device types 201, mapping devices 202, and control commands 208.

In step S360, the media/multi-device synchronization controlling system controls synchronization of media and devices on the basis of device synchronization control data (i.e., data necessary for device synchronization control) in the synchronization information table 200.

Herein, steps S340 and S350 may be performed a predetermined time before step S360 or may be completed before step S360.

Figure 4:
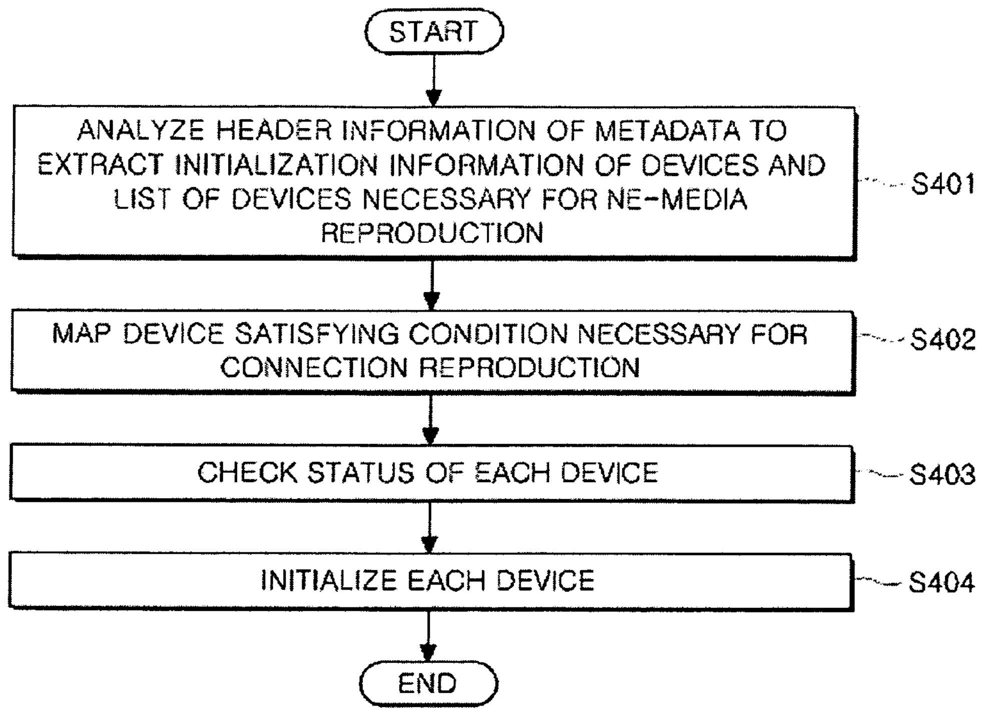
FIG. 4 is a flowchart illustrating a process for initializing devices according to an embodiment of the present invention.
Figure 5:
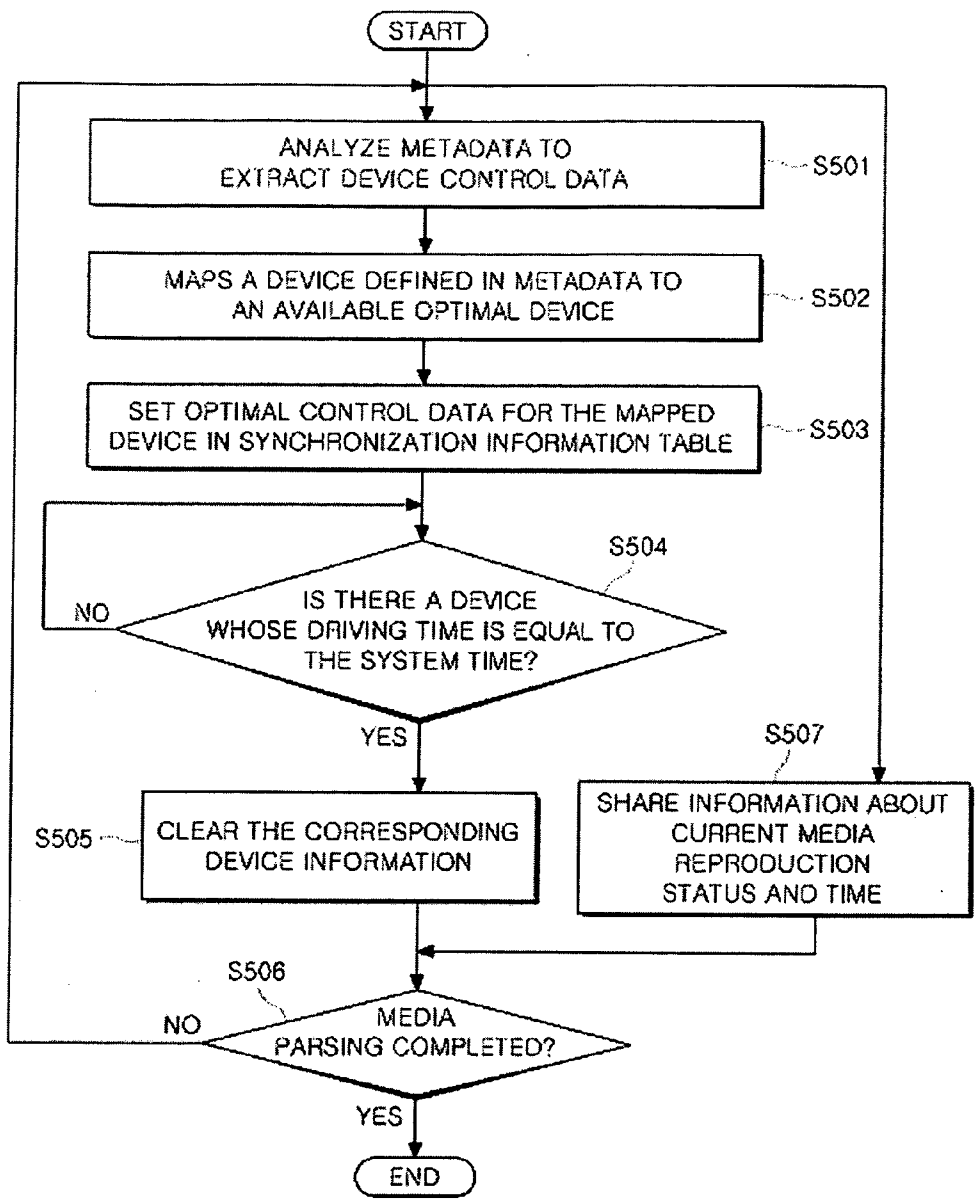
FIG. 5 is a flowchart illustrating a method for managing the synchronization information table according to an embodiment of the present invention.
Figure 6:
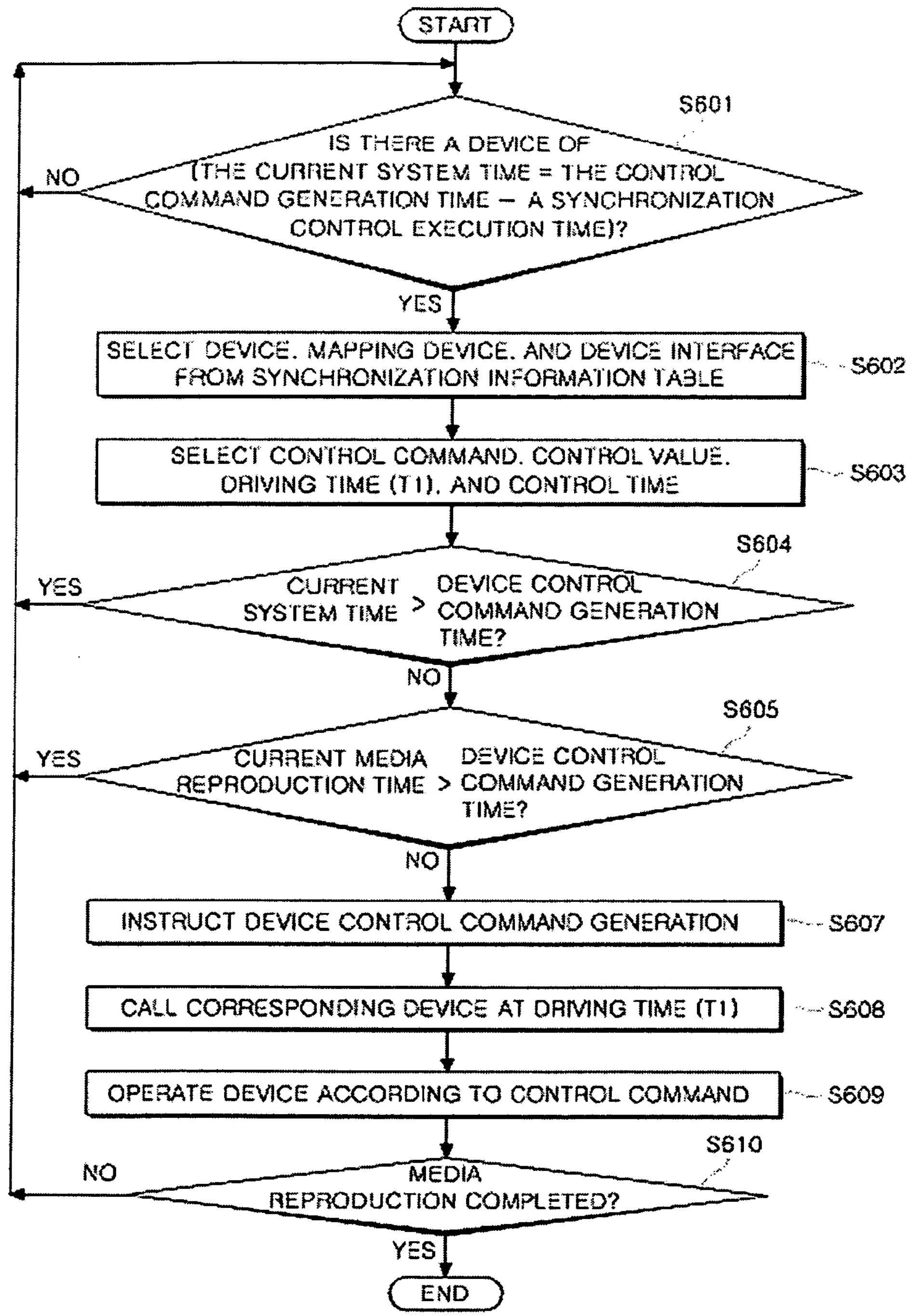
FIG. 6 is a flowchart illustrating a synchronization controlling method according to an embodiment of the present invention.

FIGS. 4 through 6 are flowcharts illustrating the detailed operations of an SMMD media service system according to an embodiment of the present invention.

FIG. 4 is a flowchart illustrating a process for initializing devices according to an embodiment of the present invention.

Referring to FIG. 4, in step 401, the media/multi-device synchronization controlling system analyzes header information of metadata to extract initialization information of devices and a list of devices necessary for ne-media reproduction.

In step 402, the media/multi-device synchronization controlling system maps a device satisfying the condition necessary for connection reproduction.

In step 403, the media/multi-device synchronization controlling system examines the status of each device in the home network. In step S404, the media/multi-device synchronization controlling system initializes each device according to the extracted initialization information.

Herein, the initialization process may be a process of supplying power to each device and performing basic setting.

Thereafter, the media/multi-device synchronization controlling system constructs the synchronization information table 200 (in step S330 of FIG. 3) and sets a list of initialized devices in the synchronization information table 200.

FIG. 5 is a flowchart illustrating a method for managing the synchronization information table 200 according to an embodiment of the present invention.

Referring to FIG. 5, in step S501, the media/multi-device synchronization controlling system analyzes metadata to extract device control data.

In step S502, the media/multi-device synchronization controlling system maps a device defined in the metadata to an available optimal device in the home network.

For example, if a visual media reproduction device is defined in the metadata, a digital television having the best quality among devices in the home network may be mapped to the mapping device 202.

In step S503, the media/multi-device synchronization controlling system sets data necessary for optimal control for the mapped device in the synchronization information table 200.

In step 504, the media/multi-device synchronization controlling system checks whether there is a device whose driving time 204 is equal to the system time.

If there is the device (in step S5040, the media/multi-device synchronization controlling system clears the corresponding device information from the synchronization information table 200 in step S505.

The reason for this is that the corresponding device information does not require any more management because it is information about a device that has already started to operate.

In step S506, the media/multi-device synchronization controlling system checks whether media parsing is completed. If the media parsing is not completed (in step S506), the media/multi-device synchronization controlling system repeats steps 501 through S506 until the completion of the media parsing.

Meanwhile, in step S507, during the execution of steps S501 through S506, the media/multi-device synchronization controlling system periodically shares information about media reproduction status and time to perform an update operation.

Herein, steps S501 through S506 and step 507 operate as separate processes and thus they can be regarded as independent tasks.

FIG. 6 is a flowchart illustrating a synchronization controlling method according to an embodiment of the present invention.

Referring to FIG. 6, in step S601, the media/multi-device synchronization controlling system monitors whether there is a device whose synchronization control start time (i.e., the control command generation time 203—a synchronization control execution time) set in the synchronization information table 200 is equal to the current system time.

If there is the device (in step S601), the media/multi-device synchronization controlling system selects the device type 201, the mapping device 202, and the device interface 207 corresponding to the device control information searched from the synchronization information table 200, in step S602.

In step S603, the media/multi-device synchronization controlling system selects the control command 208, the control value 209, the driving time 204, and the control time 205.

In steps S604 and S605, the media/multi-device synchronization controlling system checks whether the control command generation time 203 of the searched device control information exceeds the current system time or the media reproduction time (frame).

If the control command generation time 203 exceeds the current system time or the media reproduction time (in steps S604 and S605), the media/multi-device synchronization controlling system abandons generation of the corresponding device driving command and returns to step S601 to retry generation of a new control command.

Herein, the generation of the corresponding device driving command is abandoned because the time to generate the corresponding driving command has already expired.

Meanwhile, if the time to generate a control command arrives (in steps S604 and S605), the media/multi-device synchronization controlling system instructs generation of the device control command, in step S607.

In step 608, the media/multi-device synchronization controlling system calls the corresponding device 160 at the driving time 204 that has elapsed by the control time 205.

In step S609, the media/multi-device synchronization controlling system starts to operate the device according to the control command and continues the control while changing the operating status.

In step S610, the media/multi-device synchronization controlling system checks whether media reproduction is completed. If the media reproduction is not completed (in step S610), the media/multi-device synchronization controlling system returns to step S601 to repeat steps S601 through S608 until the media reproduction is completed.

Herein, it is preferable that the synchronization control execution time is at least a period of time taken to perform steps S601 through S608.

As described above, the system and method for controlling synchronization of media and multi-devices for an SMMD media service according to the present invention can vividly reproduce media by controlling synchronization of at least one device for media reproduction.

Also, the present invention analyzes metadata for media and maps optimal connectable devices according to the analysis results to optimally control the devices, thereby maximizing the effect of vivid media reproduction.

The present invention may be applied to the systems of each place such education systems, offices, public areas, theaters, and buildings as well as the home network.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A system for controlling synchronization of media and multi-devices for a Single-Media Multi-Device (SMMD) media service, the system comprising:

a metadata managing unit analyzing ne-media to extract metadata; and a synchronization controlling unit comprised of a memory, the synchronization controlling unit constructing a 2D synchronization information table to store control data extracted from the metadata, and selecting optimal ones of one or more devices for media reproduction and controlling one or more devices for media reproduction on the basis of the synchronization information table, wherein the synchronization controlling unit applies the same system time in devices in a home network allowing the devices to operate in synchronization with the same system time, wherein the 2D synchronization information table stores device media reproduction format type, a device mapped for the reproduction format type and a device command generation time.

2. The system of claim 1, further comprising a device profile managing unit for generating the profiles of devices in a home network and managing the generated device profiles.

3. The system of claim 1, further comprising a device controlling means controlled by the synchronization controlling unit, the device controlling means comprising:

a multi-device controlling unit for controlling the one or more devices;

a hardware interface unit comprising interfaces for supporting wired/wireless interfaces with the corresponding devices; and a device driver unit comprising drivers for the corresponding interfaces.

4. The system of claim 1, wherein the metadata managing unit comprises:

an ne-media parser for extracting metadata from the ne-media; and a metadata analyzing unit for analyzing/extracting data necessary for control of the devices from the metadata.

5. The system of claim 1, wherein the synchronization information table comprises device types for vivid media reproduction, mapping devices, control times, error process types, interfaces, device control commands, device control values, and media statuses.

6. A method for controlling synchronization of media and multi-devices for a Single-Media Multi-Device (SMMD) media service, the method comprising:

initializing a device interworking with media in a home network;

constructing a 2D synchronization information table;

parsing ne-media to extract metadata;

extracting data necessary for device control from the metadata to map an optimal device by selecting optimal ones of one or more devices for media reproduction, and setting/managing the extracted data in the synchronization information table; and controlling synchronization of media and devices on the basis of the synchronization information table, wherein one or more devices are interworked according to contents of the media, wherein the controlling synchronization applies a same system time in devices in the home network allowing the devices to operate in synchronization with the same system time, wherein the 2D synchronization information table stores device media reproduction format type, a device mapped for the reproduction format type and a device command generation time.

7. The method of claim 6, further comprising, before the initializing operation:

obtaining information about all devices interworking with media in the home network to construct device profiles; and applying the same system time to all the devices interworking with the media in the home network.

8. The method of claim 6, wherein the parsing operation and the extracting operation are performed a predetermined time before the controlling operation.

9. The method of claim 6, wherein the parsing operation and the extracting operation are completed before the controlling operation.

10. The method of claim 6, wherein the initializing operation comprises:

analyzing header information of metadata to extract initialization information of devices and a list of devices necessary for media reproduction;

mapping a device satisfying a condition necessary for interworking reproduction; and checking the statuses of devices in the home network to initialize the devices.

11. The method of claim 10, wherein the initialization in the device status checking operation supplies power to the devices to perform basic setting.

12. The method of claim 6, wherein the constructing operation construct the synchronization information table for storing control information for each point/device.

13. The method of claim 6, wherein the extracting operation comprises:

extracting device control information from the metadata;

mapping an available optimal device according to a device type defined in the metadata;

setting data necessary for optimal device control with respect to the mapped device;

determining whether a device driving time among the device control information is equal to a system time;

clearing the corresponding device information if the device driving time is equal to the system time;

checking whether media parsing is completed, and repeating the device control information extracting operation through the clearing operation until the media parsing is completed.

14. The method of claim 13, further comprising periodically setting reproduction status and time information of the current media during the device control information extracting operation through the checking operation.

15. The method of claim 6, wherein the synchronization controlling operation comprises:

monitoring whether there is device control information having a synchronization control start time in the synchronization information table equal to a current system time, the synchronization control start time being equal to a control command generation time minus a synchronization control execution time;

when there is the device control information, selecting a device type, a mapping device, and a device interface for control signal exchange from the synchronization information table;

selecting a control command, a control value, a driving time, and a control time for a corresponding device;

checking whether the control command generation time exceeds the current system time;

when the control command generation time does not exceed the current system time, checking whether the control command generation time exceeds a media reproduction time;

when the control command generation time does not exceed the media reproduction time, generating a device control command corresponding to arrival of the control command generation time;

calling the corresponding device at the driving time;

driving the device according to the control command; and checking whether medial reproduction is completed, and repeating the monitoring operation through the driving operation until the medial reproduction is completed.

16. The method of claim 15, wherein the control command generation time is a device control time before the device driving time.

17. The method of claim 15, further comprising, if the control command generation time exceeds the current system time or the media reproduction time in the two checking operations for the control command generation time, abandoning generation of a device driving command and returning to the monitoring operation to repeat the monitoring operation through the checking/repeating operation.

18. The method of claim 15, further comprising, if the media reproduction is not completed in the checking/repeating operation, returning to the monitoring operation to repeat the monitoring operation through the checking/repeating operation until the medial reproduction is completed.

19. The method of claim 15, wherein the synchronization control execution time is the time taken to perform at least the monitoring operation through the driving operation.

* * * * *